United States Patent

[11] 3,557,658

| [72] | Inventor | Kenneth B. Jamison<br>Los Angeles, Calif. |
|---|---|---|
| [21] | Appl. No. | 785,300 |
| [22] | Filed | Dec. 19, 1968 |
| [45] | Patented | Jan. 26, 1971 |
| [73] | Assignee | Northrop Corporation<br>Beverly Hills, Calif.<br>a corporation of California |

[54] METAL EDGE FINISHER
1 Claim, 2 Drawing Figs.

[52] U.S. Cl..................................................... 90/12,
145/4.1
[51] Int. Cl..................................................... B23c 1/20
[50] Field of Search............................................ 90/12,
24.06; 145/4, 4.1, 4.2, 5.1, 5, 8, 20; 144/134,
134.5, 136, 136.3, 117.2, 117.5; 51/170.1

[56] References Cited
UNITED STATES PATENTS

| 394,411 | 12/1888 | Stevenson..................... | 145/5 |
| 795,997 | 8/1905 | Mathews....................... | 145/4 |
| 2,344,897 | 3/1944 | Pringle............................ | 145/5X |
| 2,649,873 | 8/1953 | Reich et al.................... | 145/4 |

Primary Examiner—Gil Weidenfeld
Attorneys—Harold L. Fox and William M. Graham

ABSTRACT: Apparatus adapted to finish the edges of metallic sheet material. The apparatus constitutes a hand milling device incorporating means providing firm and true bearing surfaces—fore and aft—of the cutter member thereof, before, after and during a finishing operation.

INVENTOR:
Kenneth B. Jamison

By Harold L. Fox
AGENT

METAL EDGE FINISHER

The present invention pertains to apparatus for effecting a milling operation and more particularly to a power driven handtool, similar in appearance to a plane or cutting tool actuated (moved in a lineal direction) by hand including means insuring firm and true bearing surfaces fore and aft of the cutter element of the device. The tool also includes means rendering it especially useful in finishing the edges of titanium sheets and the like in that it includes means arresting or greatly reducing chattering accompanying damage to sheet material on an operation of this type.

Briefly, the hand milling apparatus disclosed herein has the general appearance and characteristics of a hand-operated plane, the frame member of which includes a power-actuated milling cutter mounted approximately midway between the ends of the frame member. A pair of substantially wedge-shaped members are mounted at each end of the frame of the apparatus. As mounted, the members define a pair of parallel surfaces adapted to be adjusted to different vertical distances below the axis of the cutter element. Also, the members define a plurality of grooves in which sheet material may be received and functions to arrest or reduce chattering and vibration of the sheets.

The feature referred to above renders the apparatus especially useful in finishing titanium and like sheets.

It is an object of the present invention to provide milling apparatus manually operated and providing true and firm bearing surfaces fore and aft of the cutter member.

Another object is to provide milling apparatus defining a pair of true and firm surfaces adjustable at different distances below the axis of the cutter element at locations fore and aft thereof.

Another object is to provide milling apparatus including a pair of wedge-shaped members having grooves formed therein adapted to have sheet material received therein tending to arrest or reduce chatter during an operation performed by the apparatus.

Another object is to provide milling apparatus which is economical to construct, simple in design and free of malfunctioning tendencies.

Although the characteristic features of the present invention are particularly pointed out in the appended claims, the invention itself, also the manner in which it may be carried out, will be better understood by referring to the following description taken in connection with the accompanying drawings forming a part of this application and in which:

Figure 1:
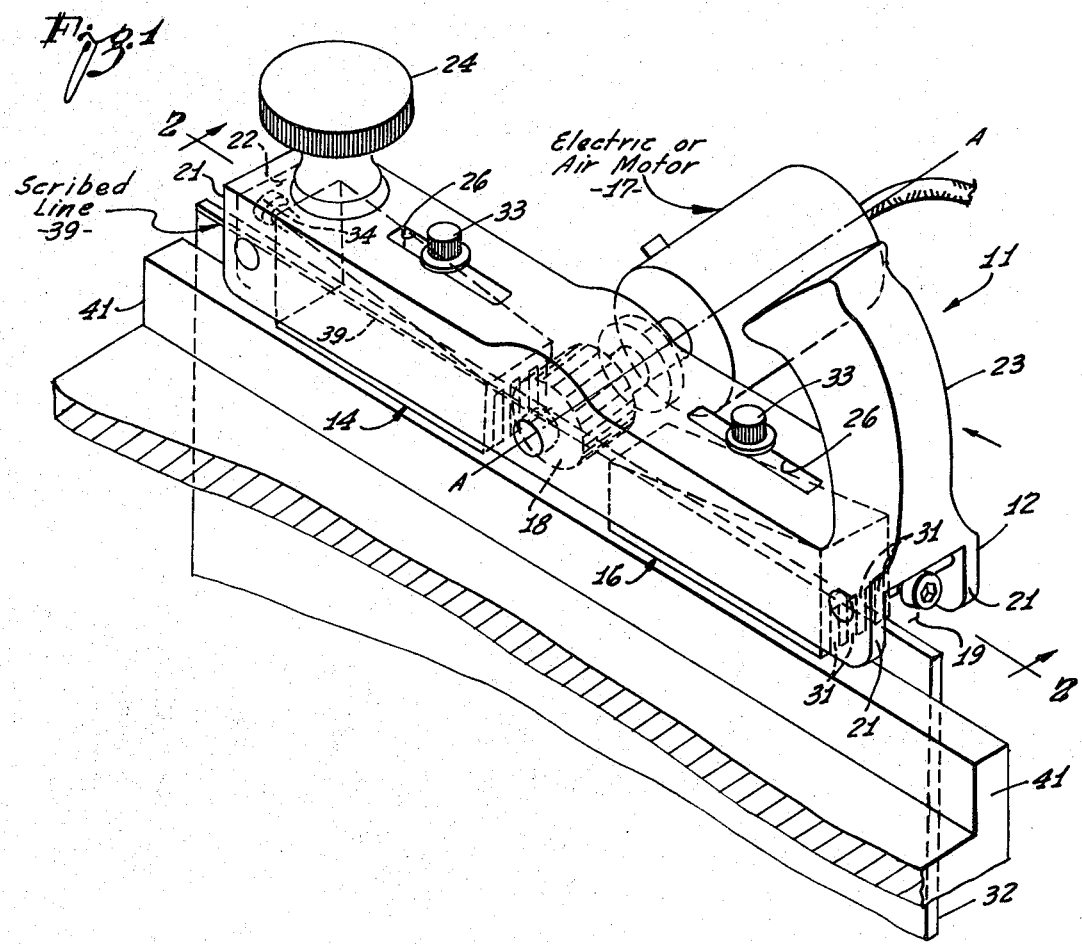
FIG. 1 is a perspective view of apparatus as disclosed herein.
Figure 2:
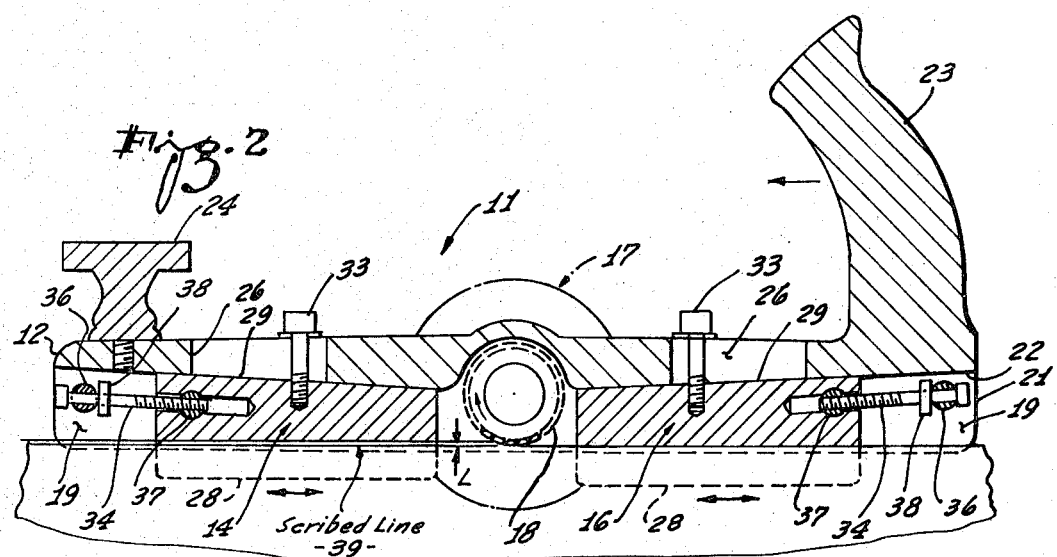
FIG. 2 is a view of the apparatus shown in FIG. 1 taken on the line 2-2 of the latter FIG.

Referring to the drawing, milling apparatus 11 of the type disclosed herein is shown in FIGS. 1 and 2. The apparatus 11 normally is operated and functions similarly as a hand-operated plane or similar hand tool. Principle components of the apparatus 11 constitutes a frame member 12, a pair of tapered members 14 and 16, a motor 17 and a cutter member 18.

The frame member 12 is of elongated configuration defining a pair of passageways 19-19 adapted to receive the members 14 and 16. The passageways 19-19 are defined by side and upper walls 21 and 22, respectively, the walls 22 increasing in thickness from a minimum at the ends of the frame member 12 to a maximum thickness at its midsection. The upper walls 22 of the passageways 19-19 are further characterized in that they define plane surfaces serving a purpose that will become apparent as the disclosure progresses. The cutter member 18 is rotatably mounted in the sidewalls 21 of the member 12 substantially at the midsection thereof as shown. Driving means for the cutter 18 is provided by an electric or air motor 17 the axis of which coincides with the axis of the cutter 18 as indicated by the line A-A in FIG. 1. The apparatus 11 is provided with handle and knob members 23 and 24 located at the aft and forward ends thereof, respectively, the handle and knob members providing means whereby linear movement and guidance are imparted to the apparatus 11. The base member 12 defines a pair of elongated passageways 26 adjacent each end of the member 12 serving a purpose that will become apparent as the disclosure progresses.

As previously stated the members 14 and 16 are received in the passageways 19-19. The members 14 and 16 are wedge shaped having lower surfaces 28 and upper surfaces 29 canted with respect to the lower surfaces. The thickness of the outer ends of the members 14 and 16 exceeds that of their inner ends and as assembled the upper surfaces 29 of the members 14 and 16 have a full contacting and sliding relation with the upper walls 22 of the passageways 19. A plurality of grooves 31 are provided in the lower surfaces of the members 14 and 16, the upper surfaces of the grooves 31 have a parallel relation with the respective lower surfaces 28. The grooves 31 being of a size to receive a plate 32, the edge portions of which are to be finished. The members 14 and 16 are assembled as just described by means of setscrews 33 which pass through the passageways 26 as best seen in FIG. 2.

Means for imparting movement to the members 14 and 16 are provided by a pair of screw members 34 terminating in Allen heads located at the aft ends of the members. Mounting for the screw members 34 are provided by rod members 36 and 37 of cylindrical configuration, the rod members being pivotally mounted in the side walls 22 and the bodies of the members 14 and 16, respectively, substantially as shown in FIG. 2. Threaded bores, adapted to receive the shank (screw portions) of the screws 34, are provided in the rod members 37. The respective diameters of the drilled holes formed in the members 14 and 16, inboard and outboard of the rod members 37, exceed the diameters of the screw members 34 allowing a slight angular movement thereof in the drilled holes. Fixed collars 38 are provided on the screw members 34 on the inboard side of the rod members 36, the collars 38 acting as stop members resulting in longitudinal movement of the members 14 and 16, at such time as the screws 34 are rotated — either in a clockwise or counterclockwise direction.

Components of the milling apparatus having been described, a better understanding thereof will be forthcoming from the following discussion of the operation of the apparatus 11.

A sheet of metallic material 32 is mounted in a vise or holding device 41 substantially as shown in FIG. 1. A scribe line, indicated by the numeral 39 in FIG. 1, indicating the depth of cut or finish to be made on the plate 32 is first scribed thereon. The apparatus 11 is then positioned on the sheet 32, substantially as shown in FIG. 1. As positioned, the edge of the plate 32 is received in one of the grooves 31. The member 14 is adjusted (moved longitudinally by means of the member 12) by means of the forward screw member 34. Longitudinal movement of the member 14 results in raising or lowering the member 14, with respect to the element 14, so that the cutter member 18 cuts along the scribe line 39. In other words the member 14 rests on the unfinished top edge of the plate 32 and provides a firm bearing surface for the apparatus 11 — forward of the cutter 18 — at the start of a milling or finishing operation.

Thus the cut is initiated, as the member 16 approaches the finished edge of the plate 32, the member 16 is adjusted (longitudinally moved) on the member 12. The member 16 (the upper portion of the groove 31 in which the plate 32 is received) is positioned so that the finished upper surface of the plate 32 provides a second firm and true surface for the apparatus 16. Thus it is seen that the apparatus 11 provides firm and true guiding surfaces fore and aft of the cutter member 18 and a cut coinciding with the scribe line 39 will be effected.

During the operation described above, it will be seen that the unfinished upper edge of the plate 32 provides a firm and true bearing surface for the member 14. Subsequently the finished portion of the plate 32 provides a firm and true bearing surface for the member 16. In other words, during a finishing operation, first (forward) bearing surface is provided by the member 14 and unfinished edge of the plate 32 and a second bearing surface is provided by the member 16 and the finished edge of the plate 32. In this respect, it will be noticed that the member 16 is necessarily lower than the member 14, thus it will be seen that the members 14 and 16 can be adjusted independently of each other as shown by the dimension L in FIG. 2.

After the above adjustments are effected, the members 14 and 16 are locked in position by means of the screws 33. Further it will be understood that the above adjustments are made by means of the screws 34, the screws 34 being of the Allen head type. The surfaces 29 of the members 14 and 16 can be considered as camming surface functioning to elevate or depress the members 14 and 16.

Further it will be noticed that the upper edge (edge being finished) of the plate 32 is received in one of the grooves 31. This feature arrests or greatly reduces chattering and vibration of the plate 32 and consequently the possibility of damage resulting from these causes.

Thus it will be seen that a milling cutter, operatable by hand, provides the various objects of the invention.

I claim:

1. Apparatus adapted to finish the edges of metal sheets, plates and like articles rendering the edges thereof smooth and free of waviness comprising:
   a. an elongated frame member of integral construction comprising a substantially flat upper, side and base surfaces;
   b. a cutter member rotatably mounted in said frame member at the midsection thereof with the axis of said cutter member having a normal relation with respect to said side surfaces;
   c. said base surface constituting a pair of plane surfaces canted with respect to said upper surface rendering said frame member thicker adjacent said cutter member than at its ends;
   d. a pair of elongated wedge-shaped members having plane upper surfaces, parallel side surfaces and lower surfaces;
   e. said wedge-shaped members defining a plurality of grooves opening on said lower surfaces, and extending parallel to said side surfaces;
   f. said grooves further characterized in that they are all rectangular in lateral cross section, terminating in plane flat surfaces having a parallel relation with respect to the upper surface of said wedge-shaped member in which they are formed and the grooves formed in one of the wedge-shaped members being of the same width as corresponding grooves formed in the other of said wedge-shaped members;
   g. said pair of wedge-shaped members being mounted in said frame member with the thickest ends thereof positioned adjacent the ends of said frame member, with the upper surfaces of said wedge-shaped members in flush and contacting relation with said canted surfaces;
   h. said pair of wedge-shaped members, as mounted in said frame member, being further characterized in that grooves of corresponding width are aligned;
   i. and means in said frame member adapted to move said wedge-shaped members longitudinally of said frame member whereby the terminating surfaces of said grooves may be located different perpendicular distances with respect to the axis of said cutter member.